United States Patent
Kapoor

(10) Patent No.: US 10,529,244 B2
(45) Date of Patent: Jan. 7, 2020

(54) PERSONALIZED TUTORING STREAMS IN A MODULAR LEARNING SYSTEM

(75) Inventor: Samridh Kapoor, Mumbai (IN)

(73) Assignees: Monk Akarshala Design Private Limited, Mumbai (IN); Monk Akarshala Inc., Sacramento, CA (US)

(*) Notice: Subject to any disclaimer, the term of this patent is extended or adjusted under 35 U.S.C. 154(b) by 591 days.

(21) Appl. No.: 14/344,531

(22) PCT Filed: Sep. 13, 2012

(86) PCT No.: PCT/US2012/054963
§ 371 (c)(1),
(2), (4) Date: Mar. 12, 2014

(87) PCT Pub. No.: WO2013/040110
PCT Pub. Date: Mar. 21, 2013

(65) Prior Publication Data
US 2014/0342336 A1    Nov. 20, 2014

(30) Foreign Application Priority Data
Sep. 13, 2011  (IN) .......................... 2604/MUM/2011

(51) Int. Cl.
G09B 5/06    (2006.01)
G06Q 10/06   (2012.01)
G06Q 10/10   (2012.01)
G06Q 50/20   (2012.01)

(52) U.S. Cl.
CPC ......... *G09B 5/06* (2013.01); *G06Q 10/06311* (2013.01); *G06Q 10/10* (2013.01); *G06Q 50/20* (2013.01)

(58) Field of Classification Search
CPC ... G09B 5/00; G09B 5/02; G09B 5/14; G09B 7/00; G09B 7/04; G09B 19/00; G09B 19/165; G06Q 10/06; G06Q 10/10; G06Q 10/06311; G06Q 10/06312; G06Q 10/06314; G06Q 10/063116; G06Q 50/205
USPC ................................................. 434/322, 323
See application file for complete search history.

(56) References Cited

U.S. PATENT DOCUMENTS

| | | | | |
|---|---|---|---|---|
| 5,270,920 A | * | 12/1993 | Pearse | G06Q 10/06 705/7.16 |
| 7,467,947 B2 | * | 12/2008 | Sperle | G09B 5/00 434/322 |
| 7,558,853 B2 | | 7/2009 | Alcorn et al. | |
| 8,121,985 B2 | * | 2/2012 | Krebs | G09B 5/00 707/687 |
| 9,229,929 B2 | * | 1/2016 | Kapoor | G06F 17/28 |
| 2002/0013836 A1 | * | 1/2002 | Friedman | G06Q 30/0206 709/223 |

(Continued)

*Primary Examiner* — Robert J Utama
(74) *Attorney, Agent, or Firm* — Nixon Peabody LLP

(57) ABSTRACT

An apparatus and method are disclosed for generating a personalized tutoring stream in a modular learning system. Learning applications are stored in the modular learning system, each associated with at least one application service. The modular learning system receives a performance request specifying one or more learning applications. After determining an availability of application services associated with the one or more specified learning applications, the modular learning system adds the specified learning applications to a tutoring stream associated with the tutoring user.

11 Claims, 7 Drawing Sheets

(56) References Cited

U.S. PATENT DOCUMENTS

| | | | |
|---|---|---|---|
| 2005/0021352 A1* | 1/2005 | Maierhofer | G06Q 10/06314 |
| | | | 705/7.24 |
| 2005/0164154 A1* | 7/2005 | Solomon | G09B 7/00 |
| | | | 434/350 |
| 2006/0127871 A1 | 6/2006 | Grayson | |
| 2008/0160491 A1 | 6/2008 | Allen et al. | |
| 2008/0254429 A1* | 10/2008 | Woolf | G09B 7/02 |
| | | | 434/322 |
| 2009/0035733 A1 | 2/2009 | Meitar et al. | |
| 2009/0305201 A1* | 12/2009 | Gorup | G06Q 20/102 |
| | | | 434/118 |
| 2009/0319321 A1* | 12/2009 | Pruskowski | G06Q 10/06311 |
| | | | 705/7.13 |
| 2011/0129808 A1 | 6/2011 | Srivastava | |

* cited by examiner

| | |
|---|---|
| Certification Metadata 302 | Scoring Metrics Metadata 304 |
| Language Metadata 306 | Performance Type Metadata 308 |
| Duration Metadata 310 | Subject Link/Tag Metadata 312 |
| Age Level Metadata 314 | Learning Facility Metadata 316 |
| Authoring Metadata 318 | Sequence Metadata 320 |
| Tool Metadata 322 | Mode Metadata 324 |
| Media Metadata 326 | Medium Metadata 328 |
| Job Skill Metadata 330 | Error Metadata 332 |
| Template Metadata 334 | Tutor Metadata 336 |
| Learning Application 300 ||

*FIG. 3A*

PERSONALIZED TUTORING STREAMS IN A MODULAR LEARNING SYSTEM

CROSS REFERENCE TO RELATED APPLICATIONS

This application is a U.S. National Stage of International Application No. PCT/US2012/054963, filed Sep. 13, 2012, which claims the benefit of Indian Provisional Specification No. 2604/MUM/2011, titled "Personalized Tutoring Streams in a Modular Learning System" filed on Sep. 13, 2011, both of which are incorporated by reference herein in their entireties.

FIELD OF THE ART

The present invention relates generally to modular learning systems, and more particularly to personalized tutoring stream generation systems and methods in a modular learning system.

DESCRIPTION OF THE RELATED ART

The current education environment includes members like students or learners, teachers, tutors, coaches, guides, professors or lecturers, content authors, and organizational members like preschools, schools, colleges, universities, educational boards and professional standards authorities, admission testing authorities, placement organizations, recruiters, HR departments of organizations, educational content and media publishers and local, regional, and national governments. All the above maintain some form of transactional and functional relationships with each other.

Teachers, trainers and, optionally, educational institutions or training organizations schedule learning experiences, and the corresponding teacher schedules in the form of lectures or sessions of limited periods of time, in a predetermined order and in a predetermined quantity with a start date and end date for the entire quantum of sessions or lectures in a course or program, as well as a date, time, duration and topical agenda for each individual session, with the information communicated in the form of a digital or physical course or program schedule to the multiple students, by the teacher, professor or trainer, or, optionally, by the educational institution or training organization to both the teacher and one or multiple students. In such cases, the course or program involves sequential sessions related to the same subject, with the course schedule of each group of lectures or sessions followed by each teacher or professor and all students in the course or program. Recently, modular learning systems enable a plurality of kinds of users to establish transactional and functional relationships with each other, and such users include a plurality of tutoring users and learning users, in addition to a plurality of learning applications.

However, a modular learning system offering the purchase and performance of discrete microlearning experiences may find it difficult to schedule, organize and update the tutoring services of a given tutoring user through the traditional method employed by most educational institutions or training organizations, due to a number of reasons like the tutoring user not being an employee of the modular learning system, the tutoring user being required to schedule and confirm each micro tutoring service separately instead of as part of a course, degree or program, the learning users being potentially different for each learning application and not just for each course as in the traditional environment, a much larger number of learning user schedules coordinated than a traditional tutoring individual, as well as the compatibility constraints, service availability constraints and application mode metadata constraints of each micro tutoring request from a learning user.

Further, a modular learning system may offer individual microlearning experiences to learning users which do not form a part of a course or program, and may not be performed by the learning users or monitored by tutoring users with a particular end date in mind, but which are an endless stream of learning application performances and corresponding tutoring, monitoring or reviewing services queued in a sequence by each learning user, and with service availability for the same confirmed by a tutoring user, and, optionally, sequence compatibility confirmed by the sequence metadata of the surrounding learning applications of each learning application in the sequence metadata of the plurality of applications. In such cases, there may be no static schedule for all learning application performances of all learning users receiving tutoring, monitoring or reviewing services for the learning application performances from a given tutoring user, since there is no course or program as such; instead a dynamically updated and managed queue of learning application performances, some with associated micro tutoring services is generated for, displayed to and updated by each learning user through a personalized learning stream in the modular learning system.

SUMMARY

A system and method for dynamically generating a personalized tutoring stream in a modular learning system is provided. A personalized tutoring stream module in the modular learning system may comprise a plurality of modules and generators like a scheduling module, a tutoring user database, a learning user database, a tutoring services items sequencing module, a scheduled tutoring services database, a tutoring service items database, a tutoring services items sequencing module, a service availability module, a tutoring services item cells generator and a tutoring stream interface generator. The method of dynamically generating a personalized tutoring stream in a modular learning system environment may comprise a plurality of steps like receiving a learning application tutoring request from a tutoring user, receiving a tutoring stream display request from a tutoring user, determining service availability of the micro tutoring requests from service availability module, generating a micro tutoring service delivery interface cell, or, in some embodiments, generating a plurality of interface cells, attaching informational links, generating a personalized tutoring stream for each tutoring user using the tutoring stream generator, and displaying the same upon request to each tutoring user on the user's user device.

In another aspect the invention further provide a non-transitory computer readable storage medium storing computer program instructions executable by a processor for performing a dynamically generating a personalized tutoring stream in a modular learning system, in accordance with the invention.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 3A is a block diagram of a learning application according to one embodiment.

DETAILED DESCRIPTION

The Figures (FIGS.) and the following description relate to embodiments by way of illustration only. It should be noted that from the following discussion, alternative embodiments of the systems, methods, figures, diagrams and interfaces disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the systems, methods, figures, diagrams and interfaces illustrated herein may be employed without departing from the principles described herein. In the following description, for the purposes of explanation, numerous specific details are set forth in order to provide a thorough understanding of the various embodiments. It will be evident, however to one skilled in the art that the various embodiments may be practiced without these specific details.

Configuration Overview

A system and method for dynamically generating a personalized tutoring stream in a modular learning system is provided. A personalized tutoring stream module in the modular learning system may comprise a plurality of modules and generators like a scheduling module, a tutoring user database, a learning user database, a tutoring services items sequencing module, a scheduled tutoring services database, a tutoring services items module, a service availability module, a tutoring services item cells generator and a tutoring stream interface generator. The method of dynamically generating a personalized tutoring stream in a modular learning system environment may comprise a plurality of steps like receiving a learning application tutoring request from a tutoring user, receiving a tutoring stream display request from a tutoring user, determining service availability of the micro tutoring requests from service availability module, generating a micro tutoring service delivery interface cell, or, in some embodiments, generating a plurality of interface cells, attaching informational links, generating a personalized tutoring stream for each tutoring user using the tutoring stream generator, and displaying the same upon request to each tutoring user on the user's user device.

Figure 1:
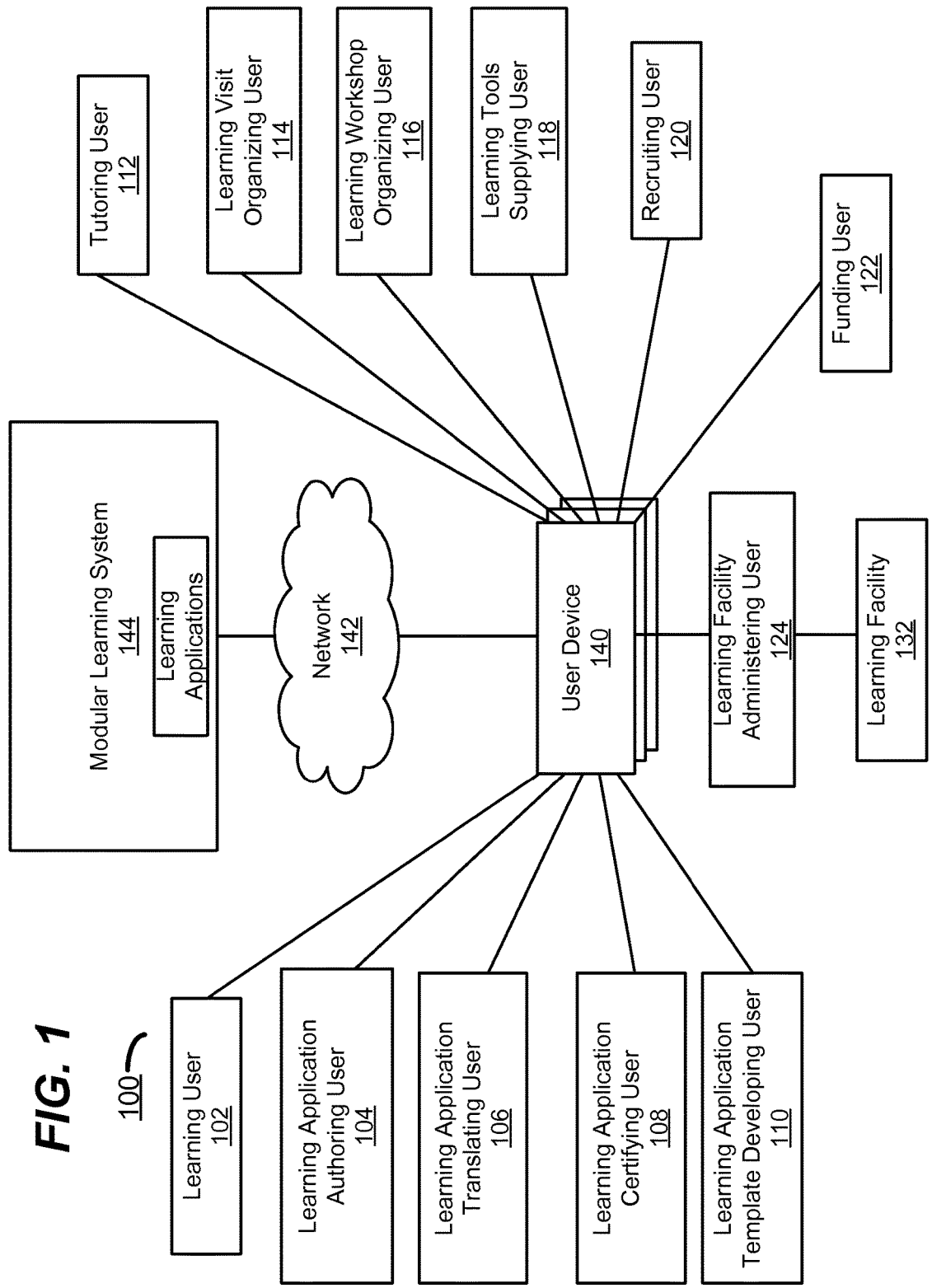
FIG. 1 is a modular learning environment including a modular learning system according to one embodiment.

FIG. 1 is a modular learning environment 100 including a modular learning system 144 according to one embodiment. Modular learning system 144 operates in modular learning environment 100 and communicates with a plurality of user devices 140 over a network 142. The user devices 140 are operated by a plurality of kinds of users in the learning environment. The user devices 140 may comprise any of a variety of computing devices, such as a desktop computer, a laptop, a mobile device, a tablet computer, a set-top box, a kiosk, interactive television, gaming console, and other computing platforms suitable for communicating with modular learning system 144. The modular learning system 144 provides a system for managing curricula, learning facilities, standardized tests, learning applications, tutors, and other modules of a learning experience in micro increments of time and money. The modular learning system 144 enables the various users to communicate with other users in a learning environment and provide services to learning user 102. The network 142 includes a wireless area network, a local area network, a General Packet Radio Service (GPRS) network, an Enhanced Data for Global Evolution (EDGE) network and the like. The user devices 140 are connected to the modular learning system 144 via the network 142.

Modular learning system 144 allows a learning user 102 to manage the purchase and performance of each module of a single microlearning service stack for a learning application (e.g., Breaststroke) or a group of learning applications (e.g., Breaststroke, Freestyle, Butterfly and Swimming Safety). Tutor access, such as access to a swimming instructor may be purchased in various increments, such as in hours. Learning content applications such as a breaststroke application with attached instructional media and other data may be purchased in timed access quantities or may be permanently purchased. Learning facility access such as an Olympic Sized Swimming Pool may be purchased in increments of hours or learning application performances such as ten laps. Learning tools or materials such as Swimming Goggles may be purchased as well. Each of these modules may be separately purchased and interacted with through an interface displayed on user device 140. In case of a learning performance which can be completed on the user device 140 itself, the learning application content is not only purchased and managed, but also performed, through an interface displayed on the user device 140. A learning user 102 may manage the purchase and performance of groups of microlearning performances in the form of learning visits and learning workshops, through an interface displayed on user device 140. Learning user 102 may manage an individual learning identity (or learning profile) and offer details of microlearning application performances completed by the learning user, as well as the personal learning metrics, scores, and reviews. This learning identity may be provided to recruiting users for the purpose of placement.

The modular learning system 144 manages, regulates and supervises the purchase, sale, preview, performance and review of a plurality of microlearning applications, each comprised modularly of a tutoring service, a learning application, learning facility access, and/or learning tools or infrastructure access, a learning visit, and/or a workshop as described in further detail below. The modular learning system 144 manages transactional and functional relationships between users of the modular learning system 144. These various users interact with the modular learning system 144 to modify learning applications and provide learning services as described below.

The modular learning system 144 may enable various other users including but not limited to tutors, authors, tool/material suppliers learning application template developers, translators, certifying user, learning facility administrators, learning event organizers, recruiters, and funders to modularly manage at least one of micro tutoring services associated with specific learning applications, microlearning content applications, microlearning application templates, translation of microlearning content applications, certification of microlearning content applications, access to learning facilities, access to learning workshops, organization of learning visits associated with specific learning applications, supply of tools, aids and/or materials, recruitment services, as well as granular funding services.

The modular learning system 144 enables a tutoring user 112 to provide micro tutoring services to learning user 102. Tutoring user 112 are typically individuals with credentials or other knowledge in the area of learning applications. The tutoring user 112 may associate themselves with particular pieces of content to and may indicate qualifications to teach each learning application, as is described further below. The modular learning system 144 manages the sale of micro tutoring services and associated tutoring user 112 with specific learning applications to learning user 102. Tutoring user 112 assist the learning user 102 with learning the subject matter of the learning application. The tutoring user may provide tutoring to the learning user 102 by meeting the learning user 102 in person to assist the learning user 102 in performing the learning application. As such, the modular learning system 144 facilitates the meeting and communication of tutors and learners. Tutoring user 112 may also provide learning performance data to the modular learning system 144. The learning performance data may indicate, for example, the level of the learner's mastery or proficiency through scoring or other metrics for reviewing performance at a learning performance task. The tutoring user 112 provides input to the modular learning system 144 using a plurality of learning applications through an interface displayed on the tutoring user's 112 user device 140.

The modular learning system 144 enables a learning application authoring user 104 to manage the drafting, editing, testing, publishing, sale and updates of learning content in applications through an interface displayed on user device 140. That is, the learning application authoring user 104 authors individual pieces of learning content which may be purchased and used by a learning user. For example, a learning application authoring user 104 may create instructional content for learning the backstroke. The instructional content may comprise instructions and multimedia, as well as directions for the learning user 102 to practice aspects of the backstroke in a suitable pool. The learning application authoring user 104 may use a pre-existing application template to create the learning application.

The modular learning system 144 enables a learning application template developing user 110 to create learning templates for use in creating learning applications. The learning application templates provide a framework for creating various types of learning applications. For example, learning application templates may comprise a quiz, simulation, role play, experiment, multimedia material, and other types of learning frameworks. The learning application template developing user 110 may manage the development, testing and sale of the learning application templates to learning application authoring users 104 through an interface displayed on a user device 140.

The modular learning system 144 enables a learning application translating user 106 to manage the translation and translation updates of learning content in applications and sale of such services to microlearning content application authors through an interface displayed on a user device 140. The translations are provided to the modular learning system 144 and may be stored with the corresponding learning application to enable providing instructions to learning users 102 in a variety of languages.

The modular learning system 144 enables a learning application certifying user 108 to certify various learning applications according to standards applied by the certifying user 108. Such certifying users may include boards of education at various levels, universities, professional standards groups, and other certification authorities. Certifying users 108 may or may not be formal institutions. For example, a certifying user may include a company establishing a set of learning applications to prepare a candidate for a job with the company. The certifying user 108 manages the certification of each learning content application as a part of their respective curricula or syllabi and manages the sale of such certification services to learning content application authoring users, through an interface displayed on user device 140.

The learning facility 132 facilitates the performance of specific learning applications available on the modular learning system 144. Learning facilities 132 may comprise any location suitable for performing types of learning applications. For example, learning facilities 132 may comprise an athletic club, a chemistry lab, a science lab, a university, a library, or a tutor's home. In some embodiments, the modular learning system 144 enables a facility administering user 124 to determine the compatibility of various learning applications which can be performed within learning facility 132 by picking the learning infrastructure available in the learning facility and associating the learning facility 132 with each learning application (e.g., Breaststroke) compatible with the learning infrastructure (e.g., Olympic sized Swimming Pool). In one embodiment, rather than expressly associating the learning facility with individual learning applications, the learning facility administering user 124 indicates to the modular learning system 144 the specific infrastructures and amenities available at the learning facility 132. In this embodiment, the modular learning system 144 enables a learning user 102 or learning application authoring user 104 to identify a learning facility 132 which is compatible with the learning application based on the infrastructure available at the learning facility 132. The modular learning system 144 may also identify compatible learning facilities based on metadata associated with the learning application and the infrastructure indicated by the learning facility administering user 124.

The learning facilities 132 may comprise a variety of types of learning facilities, such as an independent learning facility, institutional learning facility, workplace learning facility, and temporary learning facility. The modular learning system 144 enables an administrator 124 of an independent learning facility owned, managed or franchised by the modular learning system 144 to manage the sale of learning facility access for performances of specific microlearning applications as well as sale of learning tools and materials (e.g., sulphuric acid or swimming goggles) or access to the same in micro increments of time and money ($6/hour or $5/learning application performance) depending on multiple factors like the learning infrastructure to be accessed (e.g., Swimming Pool, Computers, Chemistry Lab), number of hours of access, and the like, through an interface displayed on a user device 140.

The modular learning system 144 enables an administrator 124 of an institutional learning facility like a preschool, school, college or university (e.g., Bangalore University) associated, partnered or linked with the modular learning system 144 to, in addition to managing the sale associated with the independent learning facility (e.g., learning facility access for performances of specific microlearning applications), manage the learning performances of a plurality of learners (students or outsiders) across a plurality of learning applications available on the system (with the learning user's explicit consent), optionally delegated to a plurality of teachers, professors, lecturers or coaches registered as tutoring users 112 on the modular learning system 144, through an interface displayed on a user device 140.

The modular learning system 144 enables an administrator 124 of a workspace learning facility associated, partnered or linked with the modular learning system 144 to, in addition to managing the sale associated with the independent learning facility (e.g., learning facility access for performances of specific microlearning applications), manage the learning performances of a plurality of learners (employees) across a plurality of learning applications available on the system (with the learning user's explicit consent), optionally delegated to a plurality of Human Resource Managers, Trainers and/or immediate superiors, registered as tutoring users 112 on the modular learning system, through an interface displayed on a user device 140.

The modular learning system 144 enables an administrator 124 of a temporary learning facility (e.g., a Cricket Ground available for net practice on Saturdays and Sundays from 6 am to 12 midnight) to, in addition to managing the sale associated with the independent learning facility (e.g., learning facility access for performances of specific microlearning applications), manage the hours of accessibility to the designated learning facility, through an interface displayed on a user device 140. In addition to managing the sale and performance of microlearning applications, an administrator of an independent, institutional, workspace, or temporary learning facility may manage the modular purchase of learning infrastructure (e.g., chemistry equipment, computers, cricket stumps) as well as learning tools, aids and materials (e.g., sulphuric acid, swimming goggles, cricket bat) from the modular learning system or a third party, topic wise, subject wise, location wise or otherwise based on the learning applications intended to be offered in the designated learning facility, through an interface displayed on a user device 140.

The modular learning system 144 enables a learning visit organizing user 114 to manage the organization of learning visits, and the sale of learning visits to learning users 102. The learning visit organizing user 114 may also associate a learning visit with compatible microlearning applications. Such learning visits may comprise, for example, a visit to a factory or industrial area, a museum, or a trip to a city. The learning visit organizing user 114 may associate the learning visit with learning applications and manage the learning performances during the learning visits. The management of performances of associated learning applications may be optionally provided by tutoring users 112. The learning visit organizing user 114 communicates with the modular learning system 144 through an interface displayed on a user device 140.

The modular learning system 144 enables a learning workshop organizing user 116 to manage the organization of workshops available to learning users 102. A workshop comprises a plurality of specific microlearning applications to be performed in the workshop, and a sequence of the microlearning applications to be performed at the workshop. The workshop may also specify learning tools, a designated learning facility, and a tutoring user or tutoring users to perform the workshop. As such, the workshop user organizes performance and modules of learning applications to be performed together with a group of learning users 102. The learning workshop organizing users 116 also manage the sale of such microlearning workshop access and manage the learning performances for a plurality of learners. The learning workshop organizing users communicate with the modular learning system 144 through an interface displayed on a user device 140.

The modular learning system 144 enables a learning tools supplying user 118 to provide learning tools and materials such as chemicals, biology samples, computer software, and other materials for use with learning applications to learning users 102. The learning tools supplying user 118 manages the organization and sale of the learning tools and materials (or optionally, access to the same) to learning users and administrators of learning facilities 132. The learning tools supplying user 118 may also associate learning tools with particular learning applications stored on modular learning system 144. Alternatively, the learning tools supplying user 118 may designate the tools available and the modular learning system 144 may determine which learning applications may require the tools provided by the learning tools supplying user 118. The learning tools supplying user communicates with the modular learning system 144 through an interface displayed on a user device 140.

The modular learning system 144 enables a recruiter 120 of learning users 102 to manage the recruitment of learning users 102 through the modular learning system 144. The recruiter 120 may view and filter learning users 102 by specific learning applications performed on the system, scores, metrics and reviews generated in relation to the learning applications performed by learning users 102. The recruiter may access and filter learning users 102 based on demographic data like the language used in performing the learning application. Recruiting user 120 may also operate as a certifying user 108 to certify particular learning applications that may be desirable to the recruiting user 120. The recruiting user may use the certified application as a filter prior considering learning users for a position. The recruiting user 120 manages recruiting access to the modular learning system 144 through an interface displayed on a user device 140.

The modular learning system 144 enables a funding user 122 of learning users 102 to provide funding and scholarship funds and other support to learning users 102. Such funding users 122 may comprise a parent, sibling, friend, spouse, relative, university, employer, or scholarship/grant offering institution. The funds may be provided for the funding of specific learning users or of specific learning applications, or of specific microlearning goods and services associated with the specific learning applications, in small increments, through an interface displayed on a user device 140.

Although the modular learning environment 100 is described as being composed of various, user devices (e.g., personal computer), a network (e.g., internet, intranet, world wide web), learning facilities (e.g., an Independent Learning Facility, an Institutional Learning Facility), it would be appreciated by one skilled in the art that fewer or more kinds of users (e.g., a Learning Application Fact Checking User, a Web Based Offsite Tutoring User), user devices (e.g., a mobile phone device, a portable gaming console device, a tablet device, a learning console device, gaming console device or server device attached to a television or other screen), networks (e.g., an intranet at a preschool, school, college, university, educational board, professional standards authority, coaching/tuition class; a social or professional network; an intranet at a company, HR department, training department and at a training organization) and learning facilities may comprise the modular learning environment 100, with the present disclosure still falling within the scope of various embodiments.

Figure 2:
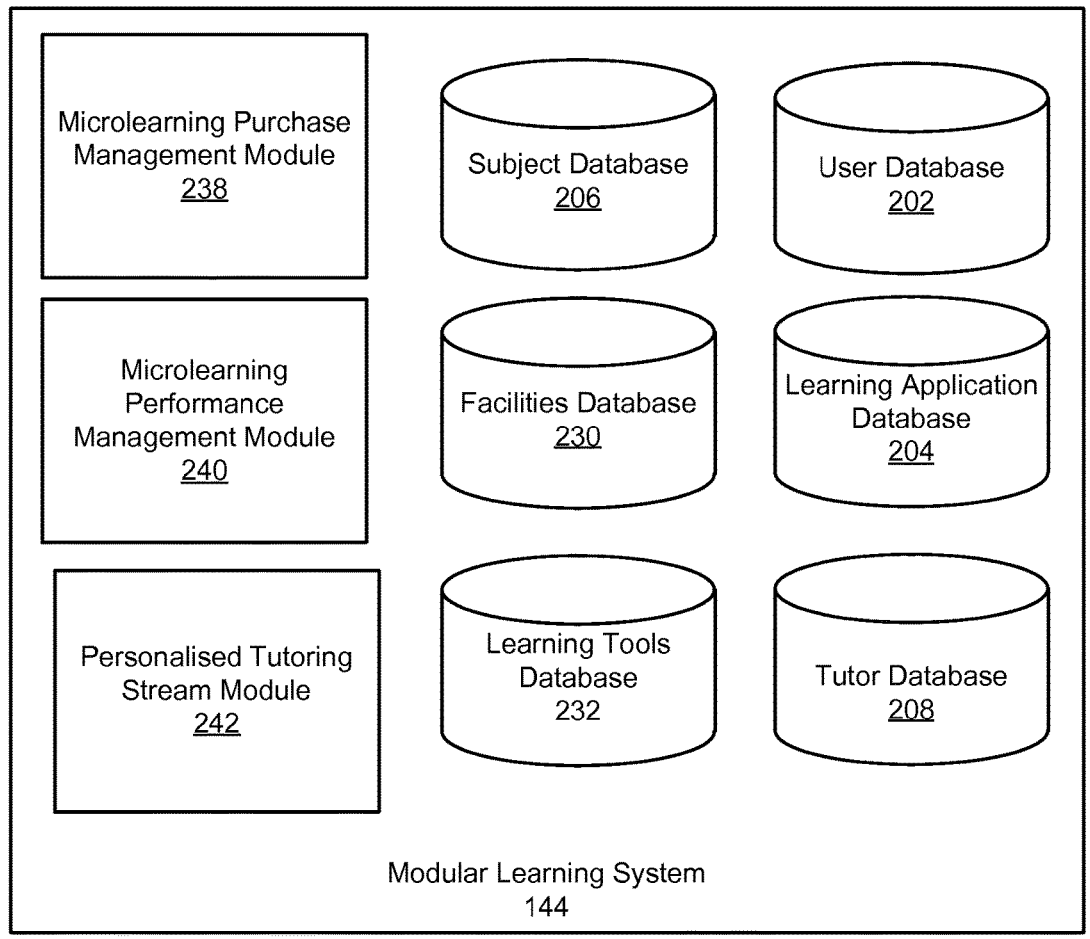
FIG. 2 is a block diagram of a modular learning system according to one embodiment.

FIG. 2 is a block diagram of a modular learning system 144 according to one embodiment. The modular learning system 144 includes a variety of databases and modules for providing learning applications and learning services to users of the modular learning system 144. The modular learning system 144 maintains learning applications in a learning application database 204. The learning applications are sold to users along with microlearning services using the purchase management module 238. Performance of learning applications is enabled by performance management module 240. Additional modules of the modular learning system 144 are described below.

A user database 202 is configured for receiving, storing, updating and retrieving a plurality of data fields of each user, such as the user's name, address, and contact details. Depending on the user's role in the modular learning system 144, the user database 202 maintains additional information on the user. For example, for a learning user 102, the user database 202 maintains learning history outside the modular learning system 144, learning application performance history on the modular learning system 144, purchase history of learning applications as well as purchase history of a host of related microlearning purchase items like, for example, timed access to learning facility 132, timed access to tutor 112, and purchase of access to a learning tool from learning tools database 232. In some embodiments, the data fields are used to determine purchase compatibility using purchase management module 238 and to determine performance compatibility using performance management module 240.

The user database 202 may maintain information about each type of user based on the user's role in the system. The user information may be stored in a plurality of databases, each database associated with a user role, or the user roles may be stored in a single user database 202. For example, the additional user roles include learning application authoring users, learning facility administering users, learning visit organizing users, learning facility administering users, and other types of users of the modular learning system 144.

In one embodiment, a distinct Learning User Database is configured for receiving, storing, updating and retrieving a plurality of data fields of each learning user 102, comprising the learning user's name, address, contact details as well as learning related data fields like learning history outside the modular learning system 144, learning application performance history on the modular learning system 144, purchase history of learning applications as well as purchase history of a host of related microlearning purchase items like, for example, access to learning facility 132, access to tutor 112, and purchase of access to an learning tool. The learning user database may be configured for temporarily receiving, storing, retrieving and updating a plurality of identity items of the subset of learning users requesting tutoring services or being tutored by any tutoring user at any point in time from among the larger plurality of learning users present in user database 202 of the modular learning system 144.

In one embodiment, a distinct Learning Application Authoring User Database is configured for receiving, storing, updating and retrieving a plurality of data fields of each learning application authoring user, say, user 104. In one embodiment, a distinct Independent Learning Facility Administering User Database is configured for receiving, storing, updating and retrieving a plurality of data fields of each independent learning facility administering user, say, user 124. In one embodiment, a distinct Learning Tools Supplying User Database is configured for receiving, storing, updating and retrieving a plurality of data fields of each learning tools supplying user, say, user 118. In one embodiment, a distinct Learning Visit Organizing User Database is configured for receiving, storing, updating and retrieving a plurality of data fields of each learning visit organizing user 114. In one embodiment, a distinct Learning Application Translating User Database is configured for receiving, storing, updating and retrieving a plurality of data fields of each learning application translating user, say, user 106. In one embodiment, a distinct Learning Application Certifying User Database is configured for receiving, storing, updating and retrieving a plurality of data fields of each learning application certifying user, say, user 108. In one embodiment, a distinct Learning Application Template Developing User Database is configured for receiving, storing, updating and retrieving a plurality of data fields of each learning application template developing user, say, user 110. In one embodiment, a distinct Learning Workshop Organizing User Database is configured for receiving, storing, updating and retrieving a plurality of data fields of each learning workshop organizing user, say, user 116. In one embodiment, a distinct Recruiting User Database is configured for receiving, storing, updating and retrieving a plurality of data fields of each recruiting user, say, recruiting user 120. In one embodiment, a distinct Funding User Database is configured for receiving, storing, updating and retrieving a plurality of data fields of each funding user, say, funding user 122.

In one embodiment, a distinct Institutional Learning Facility Administering User Database is configured for receiving, storing, updating and retrieving a plurality of data fields of each, institutional learning facility administering user, say, user 124. In one embodiment, a distinct Workspace Learning Facility Administering User Database is used to is configured for receiving, storing, updating and retrieving a plurality of data fields of each workspace learning facility administering user, say, user 124. In one embodiment, a distinct Temporary Learning Facility Administering User Database is configured for receiving, storing, updating and retrieving a plurality of data fields of each temporary learning facility administering user, say, user 124. In one embodiment, a distinct Learning Facility Database is configured for receiving, storing, updating and retrieving a plurality of data fields of a plurality of kinds of learning facilities, say, facility 132, as received from a plurality of kinds of learning facility administering users, say, user 124. In one embodiment, a distinct Learning Visits Database is configured for receiving, storing, updating and retrieving a plurality of data fields of each learning visit from the respective learning visit organizing user, say user 114. In some embodiments, the data fields of the databases in the above embodiments are used to determine purchase compatibility using purchase management module 238 and to determine performance compatibility using performance management module 240.

The learning application database 204 is configured for receiving, storing, updating and retrieving all the learning application metadata of all learning applications whose purchase is managed through the module 238. Optionally, all purchase related metadata of the learning application, like number of copies accessed per day, segmented by location, language, learning facility, user device, as well as other learning related purchase analytics metadata that may be generated during the purchase process may be received, stored, and updated by the microlearning purchase management module in the learning application database 204.

In one embodiment, the database 204 is configured for receiving, storing, updating and retrieving all the learning application metadata of all learning applications whose performance is managed through the module 240. Optionally, all performance related metadata of the learning application, like number of copies performed per day, segmented by location, language, learning facility, user device, as well as other learning related performance analytics metadata that may be generated during the performance process may be received, stored, and updated by the microlearning performance management module in the learning application database 204.

A subject database 206 is configured for receiving, storing, updating and retrieving a plurality of data fields of each subject linked or tagged to each learning application 300 in Subject Metadata 312. The subject database 206 provides a categorization system for the learning applications and enables learning application authoring users, like user 104, to categorize learning applications as belonging to one or more subjects by associating them with one or more subjects, such subjects then stored in subject metadata 312 of each authored learning application 300. The subject database 206 also allows users to search for learning applications according to particular subjects using the subjects associated with the learning applications. For example, a tutoring user 112 with a mathematics specialty may search the learning applications using the subject database 206 to identify mathematics learning applications for the tutor to associate his services with.

A tutor database 208 is configured for receiving, storing, updating and retrieving a plurality of data fields of each tutoring user, comprising the tutoring user's name, address, contact details, as well as learning related data fields like learning users to whom microlearning services have or are being provided, performance data and performance review data for the tutoring services, tutoring history outside the modular learning system 144, and remittance history. In some embodiments, the data fields are used to determine purchase compatibility using purchase management module 238 and to determine performance compatibility using performance management module 240.

A learning facility database 230 is configured for receiving, storing, updating and retrieving a plurality of data fields of a plurality of kinds of learning facilities such as learning facility 132 as received from learning facility administering users 124. In some embodiments, the data fields are used to determine purchase compatibility using purchase management module 238 and to determine performance compatibility using performance management module 240.

A learning tools database 232 is configured for receiving, storing, updating and retrieving a plurality of data fields of each learning tool or material from each learning tools supplying user 118. In some embodiments, the data fields are used to determine purchase compatibility using purchase management module 238 and to determine performance compatibility using performance management module 240.

Each of these databases, such as the tutor database 208, facilities database 230, and learning tools database 232, may also include information relating to purchase and performance compatibility. For example, a tutor in the tutor database may specify the tutor is only willing to teach students aged 30-40, or a learning facility may indicate it is only willing to allow entry to learning users who are a member of the facility.

A purchase management module 238 is configured for managing the purchase of learning content modules and a plurality of associated application services as a microlearning stack by the learning user 102.

A performance management module 240 is configured for managing the performance of learning content modules and a plurality of associated application services as a microlearning stack by the learning user 102.

A personalized tutoring stream module 242 is configured for generating personalized tutoring streams in a modular learning system. In one embodiment, the tutoring stream module 242 receives a learning application tutoring request from a tutoring user. After determining availability of services associated with the requested learning application, the tutoring stream module 242 adds the learning application to a tutoring stream of the tutoring user. The tutoring stream may be displayed to the tutoring user through a specialized interface generated on the user's device 140.

In one embodiment, the tutor database, learning facilities database, tools database and other application services databases form a single consolidated application services database in modular learning system 144.

Although the modular learning system 144 is described as being composed of various components like databases and modules, the modular learning system 144 may comprise fewer or more databases, components, and other modules. For example, the modular learning system 144 may include a Learning Application Genre Database, a Locational Learning Facility Price Range Database, a Learning Workshop Database, a Multilingual Dictionary Database, a Concept Tags Database, a Learning Objectives/Outcomes Database, and a Micro tutoring Services Database, and a Skill and Ability Tags Database. The modular learning system 144 may also include an Age Compatibility Module, a Learner Ranking Module, a Tutor Ranking Module, a Learner Billing Module, a Tutor Remittance Module, a Profile Management Module, a User Roles Management Module, a Learning Tools Management Module, a Learning Facility Management Module, Metadata Management Module, a Notification Module, a Recruitment Module, a Funding Module, a Map Module, a Learning Application Template Programming Interface Module, an Age Compatibility Module or a Translation Interface Module, with the present disclosure still falling within the scope of various embodiments. In some embodiments, an individual or group may play a plurality of user roles on the modular learning system, (e.g., tutoring user learning new applications as a learning user through another tutoring user, a learning application authoring user translating the authored application or developing the application template), with the present disclosure still falling within the scope of various embodiments.

In various embodiments the modular learning system 144 may be any of a web application, a mobile application, or an embedded module or subsystem of a social networking environment, a learning content management system, a learning management system, a professional networking environment, an electronic commerce system, an electronic payments system, a mobile operating system, a computer based operating system, or of a tablet based operating system, with the present disclosure still falling within the scope of various embodiments.

In one embodiment, a distinct roles management module is configured for managing and authorizing different roles associated with the various users of the modular learning system 144 and in the respective user databases. For example, the roles management module may provide distinct feature tabs and functionalities to each user based on the role associated with him or her. It can be noted that, the roles management module may enable a user to have one or more roles for accessing the modular learning system 144. For example, a tutoring user can avail the functionality and interface tabs of a learning user and also of a translating user if authorized by the modular learning system 144.

In one embodiment, a distinct metadata management module is configured for managing metadata associated with a plurality of specific learning applications, like learning application 300. In one embodiment, the metadata management module is configured for receiving, storing, updating and retrieving various types of metadata associated with each learning application 300 in the learning application database 204. In another embodiment, the metadata management module is configured for receiving and storing updated metadata of a specific learning application 300 in database 204 at regular intervals of time as updated by different users in authorized user roles and retrieving the required metadata when requested by the purchase management module 238 and the performance management module 240 for determining compatibility and performance compatibility of requested microlearning service stack respectively. In yet another embodiment, the metadata management module enables various users of the modular learning platform to update metadata associated with specific learning applications in the learning application database according to their user role.

It is appreciated that, in some embodiments, various databases like 202, 204, 206, 208, 230, and 232, 238, 240 and 242 as well as the databases, engines, modules and components of the above embodiments may be stored in the form of machine readable instructions in the memory of the modular learning system 144 and executed by a processor of the modular learning system 144 to perform one or more embodiments disclosed herein. Alternatively, the various databases like 202, 204, 206, 208, 230, 232, 238, 240 and 242 as well as the databases, engines, modules and components of the above embodiments may be implemented in the modular learning system in the form of an apparatus configured to perform one or more embodiments disclosed herein.

FIG. 3A is a block diagram of a learning application 300, according to one embodiment. Each learning application 300 comprises a plurality of kinds of application metadata in addition to the instructional content and associated media for a particular topic or subject. The instructional content and media of each learning application 300 may comprise a specific unit of instruction for a particular portion of knowledge or a skill, and may vary widely in scope. The learning application 300 may be very narrow in scope, such as "treading water" or may be broad in scope, such as "overview of world history", depending on the authoring process of learning application authoring user 104. The learning application 300 could indicate a theoria (to think, a theory based application using primarily memory, reasoning, logic) performance type or a praxis performance type (to do, a practical performance type or a poeisis performance type). The learning application 300 may comprise metadata indicating associated application services for purchasing or performing the learning application 300 like tutor metadata 336, tools metadata 322 and learning facility metadata 316. In one embodiment, the learning application 300 may be requested for purchase or performance with associated application services as a microlearning service stack, wherein the application services comprise of access to tutoring user 112, access to a learning tool from learning tools database 232 and access to a learning facility from facilities database 230. For example, the media metadata 326 of a learning application 300 provided by learning application authoring user 104 may specify instructions for learning how to swim a breaststroke, but the media metadata 326 does not typically specify individual pools i.e. learning facilities to perform the learning application or tutors to coach and review the performance. Rather, the application services metadata like tutor metadata 336, tools metadata 322 and learning facility metadata 316 indicates tutors, tools, and facilities which the learning user may choose to perform the learning application's instructions.

The Certification Metadata 302 is used to receive, store, retrieve, display and update certification history as well as live certifications of the learning application 300, including, for example, a certification from educational board 108 and another educational board in another state, present as a certifying user in database 202 or a distinct certifying user database. In some embodiments, the certification metadata is also used to determine purchase compatibility in the microlearning purchase management module 238 through learning application database 204 and to determine performance compatibility in the microlearning performance management module 240 through learning application database 204.

The Scoring Metrics Metadata 304 is used to receive, store, retrieve, display and update a plurality of metrics for quantitative and qualitative scoring as defined and updated for learning application 300 by learning application authoring user 104. In some embodiments, the quantitative scoring of each metric is conducted during the performance by a dedicated module within the learning application 300 itself, while in other embodiments of a performance, especially a non-screen based praxis or poeisis performance, the quantitative and optionally, qualitative score for each metric is received through a user device 140 from the learning user 102 and/or the tutoring user 112. In some embodiments, the scoring metrics metadata is also used to determine purchase compatibility in the microlearning purchase management module 238 through learning application database 204 and to determine performance compatibility in the microlearning performance management module 240 through learning application database 204.

The Language Metadata 306 is used to receive, store, retrieve, display and update a plurality of translations of all user viewable application metadata for learning application 300 translated by, for example, learning application translating user 106 into Bengali, comprising of media metadata 326 like instructional text, subtitles to audio and video instructions, and all other linguistic content for the preview, performance and review of learning application 300 by learning user 102 and preview and review of the learning performance by tutoring user 112. In some embodiments, metadata 306 further comprises translations in at least one other language, of performance type metadata 308, duration metadata 310, subject links and tags metadata 312, age level metadata 314, learning facility metadata 316 authoring metadata 318, sequence metadata 320, tool metadata 322, mode metadata 324, medium metadata 328 and job skill metadata 330. In some embodiments, the language metadata is also used to determine purchase compatibility in the microlearning purchase management module 238 through learning application database 204 and to determine performance compatibility in the microlearning performance management module 240 through learning application database 204.

The Performance Type Metadata 308 is used to receive, store, retrieve, display and update the performance type of the learning application 300. For example, the metadata 308 could indicate a theory (to think, a theory based application using primarily memory, reasoning, logic, like a 'Biomechanics of Swimming' Pop Quiz) performance type or a praxis performance type (to do, a practical performance type like an 'eight hundred m Freestyle Swim as per Olympic performance guidelines' or a poeisis performance type (to make, a creation oriented performance type like a 'five minute Synchronized Swimming Choreography'), such that the learning user is already aware of the task or performance type before purchasing and performing the learning application 300. In some embodiments, the performance type metadata is also used to determine purchase compatibility in the microlearning purchase management module 238 through learning application database 204 and to determine performance compatibility in the microlearning performance management module 240 through learning application database 204.

The Duration Metadata 310 is used to receive, store, retrieve, display and update the suggested duration of the learning application 300. In some embodiments, the metadata 310 indicates a fixed duration like, fifteen minutes, or thirty minutes, or one hour, while in other embodiments, the metadata indicates a variable duration with, optionally, a predetermined minimum or maximum duration depending on the duration metadata set by the learning application authoring user 104. In some embodiments, the duration metadata is also used to determine purchase compatibility in the microlearning purchase management module 238 through learning application database 204 and to determine performance compatibility in the microlearning performance management module 240 through learning application database 204.

The Subject Metadata 312 is used to receive, store, retrieve, display and update a plurality of subject links and tags attached to the learning application 300 by the learning content application authoring user from among the subject links and tags present in the Subject Database 206. In some embodiments, the subject links and tags are attached to specific concepts or terms within the Media Metadata 326. In some embodiments, the subject link/tag metadata is also used to determine purchase compatibility in the microlearning purchase management module 238 through learning application database 204 and to determine performance compatibility in the microlearning performance management module 240 through learning application database 204.

The Age Level Metadata 314 is used to receive, store, retrieve, display and update the suggested age level of the learning user 102 for performance of the learning application 300. In some embodiments, the age level is set as a minimum suggested age say, for example, ten+ by the learning application authoring user 104. In other embodiments, a range of suggested learner ages is set by the learning application authoring user 104. In some embodiments, the age level metadata is also used to determine purchase compatibility in the microlearning purchase management module 238 through learning application database 204 and to determine performance compatibility in the microlearning performance management module 240 through learning application database 204.

The Learning Facility Metadata 316 is used to receive, store, retrieve, display and update the suggested learning infrastructure required in a learning facility for performance of the learning application 300. In some embodiments, such learning facilities and infrastructure (e.g., Olympic Sized Swimming Pool) required for the performance of the learning application (e.g., 800 m Freestyle to Olympic Guidelines) is received and updated by the learning application authoring user 104 by picking the same from a learning facility database 230 available on the modular learning system 144. In other embodiments the metadata 316 is received and updated by the administering user 124 of learning facility 132. In some embodiments, the learning facility metadata is also used to determine purchase compatibility in the microlearning purchase management module 238 through learning application database 204 and to determine performance compatibility in the microlearning performance management module 240 through learning application database 204.

The Authoring Metadata 318 is used to receive, store, retrieve, display and update the authoring metadata received by the learning application author 104, including for example the name, signature, contact details, intellectual property disclaimer and other information of the user or user group. In some embodiments, the metadata also includes metadata generated by the modular learning system 144 during the authoring user's editing process, including the version history, tracked changes and time stamps of edits and updates to the learning content application. In some embodiments, the metadata may also include citations to other learning content applications or other learning content application authoring users made by the user 104.

The Sequence Metadata 320 is used to receive, store, retrieve, display and update the suggested sequence of performance of the learning application 300 relative to another learning application. The sequence metadata describing one or more learning applications may indicate if the learning application should be performed before, after, instead of, or with another learning application by learning application authoring user 104. The user 104 may wish for any learning user, say 102 to perform an advanced microbiology learning application 300 only after performing a corresponding beginner's microbiology learning application, irrespective of the learning user's age or quality of performance. In other embodiments, wherein the learning application authoring user is not the author of the suggested beginner's application, the user 104 may input a sequence suggesting to the learning user 102 to perform the learning application before or after a learning application authored by another learning application authoring user. In some embodiments, the sequence metadata is also used to determine purchase compatibility in the microlearning purchase management module 238 through learning application database 204 and to determine performance compatibility in the microlearning performance management module 240 through learning application database 204.

The Tool Metadata 322 is used to receive, store, retrieve, display and update the compatible tools or learning materials to the learning application 300. In some embodiments, the tool compatibility is received from and updated by the learning application authoring user 104 by accessing the tool database 232. In other embodiments, the tool compatibility is received and updated by the learning tools supplying user 118 by accessing the learning application database 204. In still other embodiments, the tool compatibility may be updated by the modular learning system 144. In some embodiments, the tool metadata is used to determine purchase compatibility in the microlearning purchase management module 238 through learning application database 204 and to determine performance compatibility in the microlearning performance management module 240 through learning application database 204. In some embodiments, wherein the learning tool is a peripheral input device which can be connected to the user device 140 during the learning application performance (e.g., Electric Guitar attached to a user device 140 during an 'Introduction to Hard Rock' learning application) the Tool Metadata includes the compatibility to the user device 140. In other embodiments, wherein the learning material is not material to the user device 140, (e.g., Sulphuric Acid during a Chemistry Experiment) the Tool Metadata may not include any additional user device compatibility.

The Mode Metadata 324 is used to receive, store, retrieve, display and update the available modes of performance of the learning application. In some embodiments, the mode metadata is determined by the modes chosen by the learning content application authoring user from the learning application template chosen. In various embodiments, the learning application may comprise an individual learner performance mode, a learner plus learner cooperative performance mode, a learner versus learner competitive performance mode, a learner plus tutor cooperative performance mode, a learner versus tutor competitive performance mode, a limited plurality of learners (e.g., four learners) cooperative performance mode, a limited plurality of learners (e.g., four learners) competitive performance mode, a tutor plus limited plurality of learners (e.g., nine learners) cooperative performance mode (a typical classroom mode). Although the Mode Metadata is described as being composed of various available modes as chosen by the learning application authoring user, various other modes (e.g., a limited plurality of learners vs. a limited plurality of learners competitive performance mode) may comprise the Mode Metadata 324 and still fall within the scope of various embodiments. In some embodiments, the various Media Metadata for the preview, performance and review screens for each mode of the same learning application and the sequence of the same (especially wherein the learning application 300 is performed by multiple users from the same user device and, optionally, by viewing the same display device) is received, stored, retrieved, displayed and updated in the Media Metadata 326. In some embodiments, the mode metadata is also used to determine purchase compatibility in the microlearning purchase management module 238 through learning application database 204 and to determine performance compatibility in the microlearning performance management module 240 through learning application database 204.

The Media Metadata 326 is used to receive, store, retrieve, display and update text, image, audio, video, animation, links and other interactive elements of the learning content application as received and updated by the learning application authoring user 104 during the publishing and revision of the learning content application 300. In other embodiments, the learning application Media Metadata may comprise the theoria, praxis or poeisis task or, optionally, plurality of tasks to be completed during the performance, their sequence, and, optionally, the learning outcomes and objectives of the same. In some embodiments, the media metadata is also used to determine purchase compatibility in the microlearning purchase management module 238 through learning application database 204 and to determine performance compatibility in the microlearning performance management module 240 through learning application database 204.

The Medium Metadata 328 is used to receive, store, retrieve, display and update the medium of access to the learning application preview, review and performance screen during the microlearning performance. For example, for a Beginner's Kathak Dancing microlearning Application, in addition to requiring a compatible learning facility and tutoring user, the learning application authoring user 104 or, optionally, modular learning system 144 may require the preview and review screen to be viewable only on a display device connected to a learning console user device or the display device of a computer device but not a mobile device screen to ensure an optimum learning experience. In another case, for a Kathak Quiz microlearning application, the learning application authoring user 104 or, optionally, modular learning system 144 may require the performance screen, preview screen and review screen to be viewable only on a mobile device screen but not on a display device connected to a learning console user device, or the display device of a computer device. In some embodiments, the medium metadata may further comprise the compatibility to a plurality of software platforms and, optionally, runtime environments as determined by the modular learning system 144. In some embodiments, the medium metadata is also used to determine purchase compatibility in the microlearning purchase management module 238 through learning application database 204 and to determine performance compatibility in the microlearning performance management module 240 through learning application database 204.

The Job Skill Metadata 330 is used to receive, store, retrieve, display and update the skills and abilities tagged to the learning application 300 by the learning application authoring user 104, the recruiting user 120 or, optionally, the modular learning system 144 from a skills and abilities database provided by the modular learning system 144. In some embodiments, the metadata is used by a recruiting user 120 to post the completion of the learning application (optionally, in a controlled testing environment) or group of applications as a minimum requirement for a particular job role to a plurality of potentially employable learning users. In other embodiments, the metadata is used by the recruiting user 120 to post the requirement of completion of the learning application 300 (optionally, in a controlled testing environment) or group of applications as a minimum requirement for a promotion to a higher post in a particular organization, to a plurality of potentially employable learning users. In some embodiments, the job skill metadata is also used to determine purchase compatibility in the microlearning purchase management module 238 through learning application database 204 and to determine performance compatibility in the microlearning performance management module 240 through learning application database 204.

The Error Metadata 332 is used to receive, store, retrieve, display and update the potential errors which can be made by the learning user 102 (e.g., ten potential errors in an auditing microlearning application), as determined by the learning application authoring user 104. In some embodiments, wherein the learning application (e.g., a Karnataka History Quiz) is performed through an input device on a user device 140 itself, the error metadata may be synchronized to each potential input point during the learning application 300 performed through the user device 140 by the learning application authoring user 104. In some embodiments, wherein the learning application (e.g., a Karate kata) 300's error metadata is outside the recordable boundaries of the user device 140, the potential errors may be entered with reference to each instructional step of the performance by the learning application authoring user 104, such that at the time of the performance, the tutoring user (or, in some modes, the learning user 102 himself, another learning user, or the recruiting user 120) may note errors in each observable step of the performance and confirm the same on user device 140 to generate the score. In other embodiments, wherein the error observed by the observing user (say, tutoring user 112) is not part of the potential errors in the Error Metadata 332 of the application 300, the tutoring user 112 may update such errors to the Errors Metadata, or optionally, send the same to the learning application authoring user 104, to be updated after review. In some embodiments, the error metadata is also used to determine purchase compatibility in the microlearning purchase management module 238 through learning application database 204 and to determine performance compatibility in the microlearning performance management module 240 through learning application database 204.

The Template Metadata 334 is used to receive, store, retrieve, display and update the default script, formatting and media modules of the learning application template used to author the learning application 300. In some embodiments, wherein a particular sequence and format of the same has been chosen by the learning content application authoring user from the options offered in the template developed by the learning application template developing user, the chosen setting may be a part of the Template Metadata 334. In various embodiments, the learning application templates may comprise a quiz, role play, simulation, project, experiment, essay, recital, research paper, race, challenge, problem, game, question, exercise or problem set. In some embodiments, the templates may be for performances conducted and supervised in front of a display device with an input device connected to the user device 140, while in other embodiments the templates may be for previews, reviews and guidelines for performances conducted without the input device, with the user device 140 merely placed next to the performance area or learning station (e.g., for Praxis Tasks in Dance Applications) as a reference point. Although the Template Metadata is described as being composed of various available templates as developed by the learning application template authoring user and chosen by the learning application authoring user, various other templates (e.g., a Swimming Race Template, a Patent Drafting Template) may comprise the Template Metadata 334 and still fall within the scope of various embodiments. In some embodiments, the template metadata is also used to determine purchase compatibility in the microlearning purchase management module 238 through learning application database 204 and to determine performance compatibility in the microlearning performance management module 240 through learning application database 204.

The Tutor Metadata 336 is used to receive, store, retrieve, display and update the compatibility of tutoring users to learning content application. In some embodiments, the tutoring user compatibility is received from and updated by the tutoring user 112 by updating the tutor database 208 (e.g., a Mathematics Tutoring User whose medium of instruction is Mandarin updating compatibility to a plurality of Mathematics microlearning applications available in Mandarin, in the tutor database 208). In other embodiments, the tutoring user compatibility metadata is received from and updated by the tutoring user 112 by accessing the learning application database 204. In still other embodiments, the tutoring user compatibility metadata may be updated by the modular learning system 144. In some embodiments, the Tutor Metadata is also used to determine purchase compatibility in the microlearning purchase management module 238 through learning application database 204 and to determine performance compatibility in the microlearning performance management module 240 through learning application database 204.

In various embodiments, the metadata of learning application 300 is retrieved, displayed to and updated by a plurality of kinds of users as may be applicable to the kind of metadata and the kind of user. Optionally, in addition to receiving and storing the metadata, the modular learning system 144 may update the learning application metadata as and when generated in the system through a dynamic metadata update module or through a dedicated administering user. In some embodiments, the learning application authoring user 104 may further play the role of the learning application template developing user. In some embodiments, the modular learning system 144 may play the role of the learning application authoring user 104 and, optionally, the role of the learning application template developing user 110 to author and update the media and template metadata of the learning application 300.

In some embodiments, the microlearning purchase management module 238 and microlearning performance management module 240 retrieve some or all of the above metadata associated with the learning application 300 from a learning application database 204 in a repository module of the modular learning system 144.

In some embodiments, the media metadata 326 of the learning application may comprise an electronic textbook, an electronic journal, an instructional video, or an instructional animation. In some embodiments each learning application 300, may be a distinct mobile application, browser based web application, or a desktop application. In some embodiments, each learning application 300 may be an executable file, a program, add in, macro, plug-in, or other program of instructions associated with a plurality of application programming interfaces of the modular learning system 144.

Although the learning application 300 is described as comprising various metadata and associated data fields stored and updated in learning application database 204, fewer or more metadata and associated data fields (e.g., Application Programming Interface Metadata, Organization versus Organization Social Learning Mode Metadata, University versus University Social Learning Mode Metadata, Testing Metadata, Learning Visits Metadata, Learning Workshops Metadata, Tutorials Metadata) may comprise the Learning Application 300 and associated learning application database 204, with the present disclosure still falling within the scope of various embodiments. In some embodiments, each version of the same learning application 300 with different metadata, for example language metadata, is treated as a distinct learning application in learning application database 204.

In some embodiments, an authorization to update certification metadata 302 of a learning application 300 is limited to a predetermined plurality of certifying users like user 108 and recruiting users like user 120. In some embodiments, an authorization to update scoring metrics metadata 304, performance type metadata 308, age level metadata 314, authoring metadata 318, mode metadata 324, media metadata 326, medium metadata 328, and error metadata 332 of a learning application 300 is limited to a predetermined plurality of learning application authoring users like user 104. In some embodiments, an authorization to update language metadata 306 of a learning application 300 is limited to a predetermined plurality of learning application translating users 106. In some embodiments, an authorization to update duration metadata 310 of a learning application 300 is limited to a predetermined plurality of learning application authoring users like user 104 and learning application template developing users like user 110. In some embodiments, an authorization to update subject link/tag metadata 312 of a learning application 300 is limited to a predetermined plurality of users in any user role. In various embodiments, such authorizations may be set by an administrator of system 144 based on the user role, user profile information and user preferences information of the corresponding users.

In some embodiments, an authorization to update learning facility metadata 316 of a learning application 300 with associated learning facilities is limited to a predetermined plurality of learning facility administering users like user 124. In some embodiments, an authorization to update sequence metadata 320 of a learning application 300 is limited to a predetermined plurality of learning application authoring users like user 104 and tutoring users like user 112. In some embodiments, an authorization to update tool metadata 322 of a learning application 300 with associated learning tools is limited to a predetermined plurality of tool supplying users like user 118. In some embodiments, an authorization to update job skill metadata 330 of a learning application 300 is limited to a predetermined plurality of recruiting users like user 120. In some embodiments, an authorization to update template metadata 334 of a learning application 300 is limited to a predetermined plurality of learning application authoring users like user 104 and a predetermined plurality of template developing users like user 110. In some embodiments, an authorization to update tutor metadata 336 of a learning application 300 with associated tutoring services is limited to a predetermined plurality of tutoring users like user 112. In some embodiments, an authorization to update an optional learning event metadata of a learning application 300 with associated learning workshops, visits and other learning events is limited to a predetermined plurality of learning workshop organizing users like user 116 and learning visit organizing users like user 114. In some embodiments, the associations of application services to learning applications are enabled automatically by a metadata association module in the system 144. In some embodiments, each learning application 300 is associated with a subset of learning facilities in a learning facilities database 230. In some embodiments, each learning application 300 is further associated with a subset of learning stations of each associated learning facility. In some embodiments, each learning application is associated with a subset of tutors in a tutor database 208. In some embodiments, each learning application is associated with a subset of tools in a learning tools database 232.

Figure 3B:
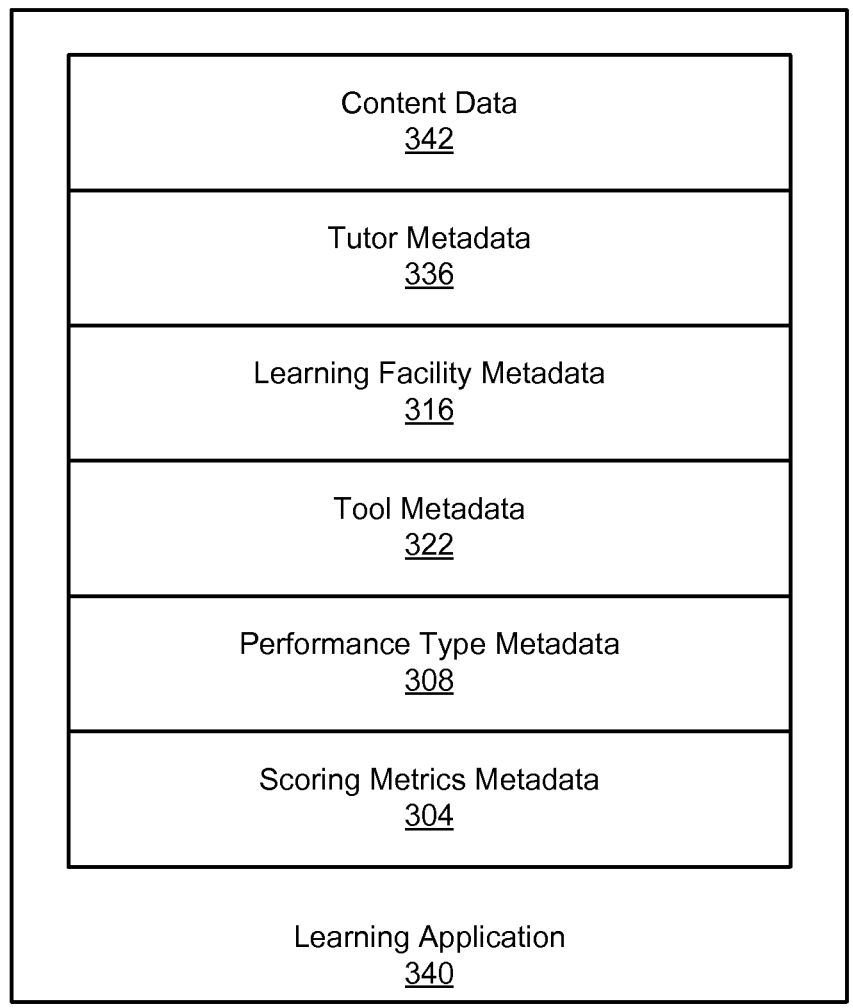
FIG. 3B is a block diagram of a learning application according to an alternative embodiment.

FIG. 3B is a block diagram of a learning application 340 according to another example embodiment. The learning application 340 is illustrated to depict metadata of the learning application related to a microlearning service stack. The learning application 340 also illustrates some other performance data used during its performance by a learner. This microlearning service stack may be requested for purchase or performance by learning user 102. In this embodiment, the microlearning service stack includes a learning application 340, a time based tutoring service by a particular tutor in database 208, time based access to a particular learning facility from database 230, and access to a particular tool from database 232. The particular services above may or may not be associated with the corresponding tutor metadata, facilities metadata, and tool metadata of learning application 340 at the time of a request. The learning application 340 includes content data 342 which designates particular content media and content attributes of the learning application 340. The learning application also includes other metadata as described above, such as tutor metadata 336, learning facility metadata 316, learning tool metadata 322, performance type metadata 308, and scoring metrics metadata 304. As such, the learning application 340 illustrates some aspects of the learning application used for purchase or performance of the learning application 340 by a learner as part of a microlearning service stack, such as content, tutors, facilities, and tools. The learning application 340 may also include any other metadata as described above with reference to FIG. 3A. Any other metadata as described above with reference to FIG. 3A may also be part of the content data 342 of the learning application 340.

The lifecycle of a learning application 300 is now described according to one embodiment. Initially, a learning application template developing user 110 creates a learning application template stored in a distinct template database in a modular learning system 144. Next, the learning application authoring user 104 publishes learning application content stored as media metadata of the learning application 300. In case a template has been chosen for the application 300, the template metadata is stored as well. The tutor metadata, learning facility metadata, learning tool metadata and other optional application services metadata indicating tutoring services, learning facilities, learning tools, and other application service types associated with the learning application 300 are dynamically updated by the corresponding tutoring users, learning facility administrators, tool suppliers and other application service providers. At this point, the learning user may modularly select application services in a microlearning stack to purchase or perform the learning application. Next, the learning user 102 selects the learning application 300 and identifies application services requested for purchase or performance as a consolidated stack. The approval of the purchase or performance request for learning application 300 and particular application services in the microlearning service stack may be determined by the specific metadata of the learning application 300 being associated with corresponding application services, and other specific metadata of the learning application being compatible with the profile information and preferences of the learning user.

Figure 4:
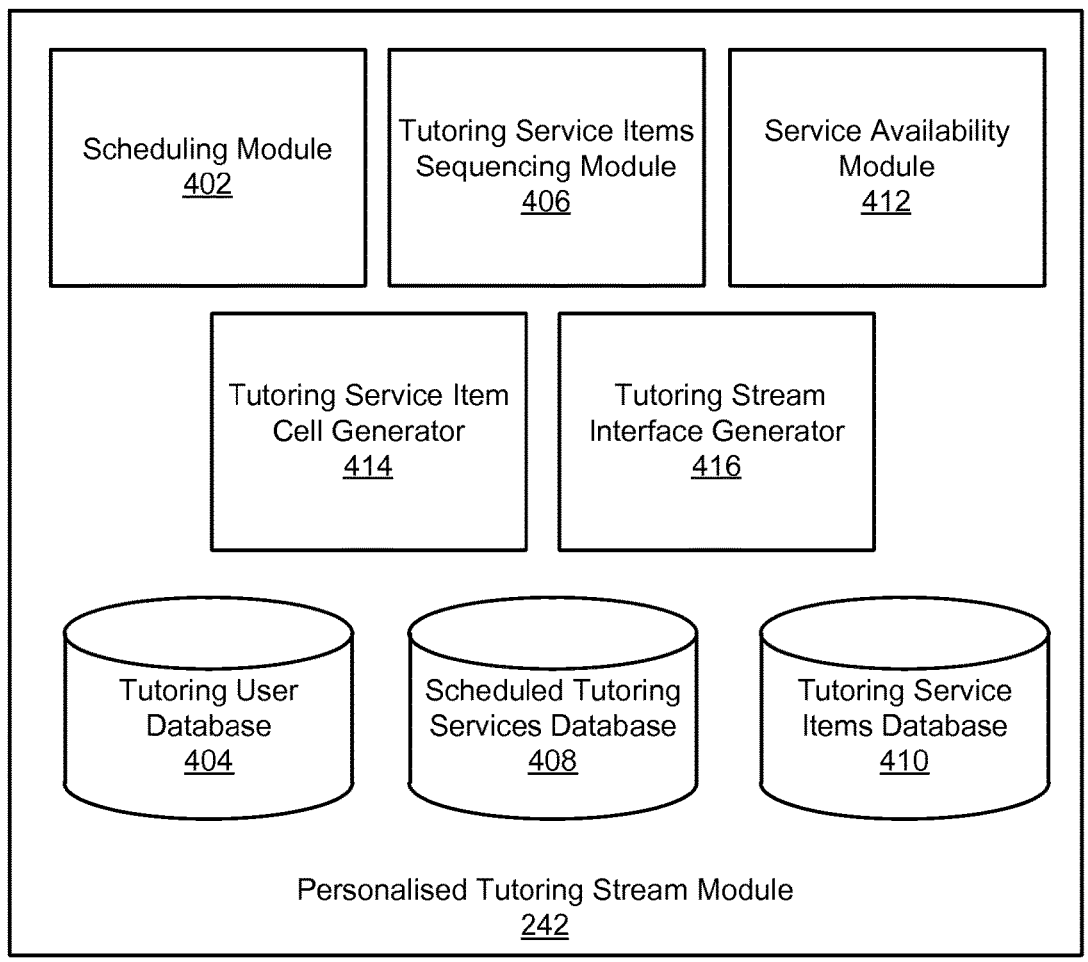
FIG. 4 is a block diagram of a personalized tutoring stream module according to one embodiment.

FIG. 4 is a block diagram of the personalized tutoring stream module 242. The scheduling module 402 is configured for receiving, storing, retrieving and updating a plurality of scheduling preferences of each tutoring user and the tutoring user's corresponding learning users and each such learning user's corresponding application service providers. In some embodiments, the scheduling module 402 may further generate schedule items for the relevant users and manage confirmation of the same. In some embodiments, the schedule confirmations may be received as inputs from the tutoring user, corresponding learning users and each such learning user's application service providers via a tutoring service scheduling interface item generated for each tutoring service item and displayed through an interface generated on a tutoring user's user device 140 and through each corresponding learning user's learning stream generated for each of the relevant learning users and the corresponding application services stream generator for each of the learning user's corresponding application service providers on any of their user devices 140 (e.g., the learning stream interface generated displayed to learning user 102, the learning facility access stream generated displayed to independent learning facility administering user 124).

In one embodiment, the scheduling module 402 may additionally or alternatively schedule tutoring events automatically. A tutoring user may for example select a recurring time (e.g., every Saturday morning), and the scheduling module 402 will schedule learning applications to be tutored at the selected time. These automatically scheduled tutoring events can be added to a tutoring stream of the tutoring user.

The tutoring user database 404 is configured for temporarily receiving, storing, retrieving and updating a plurality of identity items of the subset of tutoring users requesting generation and display of their personalized tutoring stream at any point in time from among the larger plurality of tutoring users present in tutor database 208 of the modular learning system 144.

The tutoring services items sequencing module 406 is configured for receiving, storing, retrieving and updating sequence preferences for each scheduled tutoring service in scheduled tutoring services database 408 from preferences chosen by the tutoring user 112 through the interface generated by interface generator 416 on the tutoring user's device 140. In some embodiments if the tutoring user changes the sequence of future tutoring services after confirmation of scheduling of the same by the service availability module 412 with the respective learning user, learning facility and learning tool, the sequencing module 406 sends the updated sequence preferred for the tutoring service to the service availability module 412 to generate an updated date and an updated time for the affected learning applications and confirm the same with the corresponding learning user and application service schedules. In one embodiment, the performance items sequencing module 406 retrieves sequence metadata associated with each learning application scheduled to be tutored and, if a tutoring user reschedules one performance, automatically reschedules other performances in the sequence defined by the metadata that are also scheduled to be tutored by the tutoring user.

The scheduled tutoring services database 408 is configured for receiving, storing, retrieving and updating a plurality of particulars of each scheduled tutoring service by receiving the same from the tutoring user through an interface generated by generator 416 on user device 140. In some embodiments, the particulars may include the date, time, learning facility or location, user device, learning users, learning tools and learning application metadata of each scheduled tutoring service and corresponding learning application.

The tutoring services items database 410 is configured for receiving, storing, retrieving and updating a plurality of tutoring service items generated by microlearning performance management module 240 for the tutoring user 112 during the monitoring and review of each learning application performance by the learning user. In some embodiments, the tutoring services database 410 may be accessed by interface generator 416 to recommend the provided tutoring service again, for certain learning applications already tutored by user 112 through an interface displayed on the tutoring user's user device 140. In case the tutoring user schedules the provided tutoring service for the application again, the particulars of the same may be stored in the scheduled tutoring services database 408 and later accessed by service item cell generator 414 to generate a new unique tutoring service item cell with prior tutoring history like scores or reviews generated or provided to the corresponding learning user by the tutoring user 112 to be displayed in the appropriate sequence by interface generator 416.

The service availability module 412 is configured for determining the availability of tutoring services for the plurality of tutoring service requests by accessing a plurality of tutoring services items in the tutoring user database 404 of each tutoring user 112. In some embodiments, the service availability module 412 may determine the availability of tutoring services of the tutoring user for a predetermined number of pending tutoring service requests (e.g., the availability of a mathematics tutoring user 112 to tutor, monitor or review ten different algebra exercise applications each to or for three different learning users in the next two weeks) or a predetermined date until when service availability for the learning applications needs to be determined by accessing the tutoring user's tutoring schedule and schedule preferences in from tutoring user database 404. Such preferences may be determined by each unique tutoring user or by the modular learning system 144.

The tutoring services item cells generator 414 is configured for generating a plurality of tutoring service item cells for each unique scheduled tutoring service present in scheduled tutoring services database 408. In some embodiments, the generator attaches informational links relevant to the tutoring services to each tutoring service cell for each distinct tutoring service item. For example, the cell generator 414 may generate a box to be displayed on the tutoring user's user device 140 including information associated with each scheduled tutoring service. This information may include, for example, information about learning users to be tutored, a learning facility, or learning tools purchased or rented for the performance. The cell generator 414 may additionally include metadata associated with each service that is visible within the generated box or accessible by links inside the box.

The tutoring stream interface generator 416 generates a plurality of interface items and retrieves a plurality of generated tutoring service item cells from cell generator 414 and displays the same through the personalized tutoring stream interface on a tutoring user 112's user device 140. For example, the tutoring stream interface generator 416 may arrange each cell generated by cell generator 414 in a vertical stack, enabling the tutoring user to scroll through a list of scheduled tutoring events and view information associated with each service.

Although the personalized tutoring stream module is described as being composed of various modules, fewer or more modules (e.g., Stream Duration Preferences Module, Tutoring Service Item Cell Editing Module and Tutoring Service Item Cell Display Preferences Module) may comprise the module with the present invention still falling within the scope of various embodiments.

Figure 5:
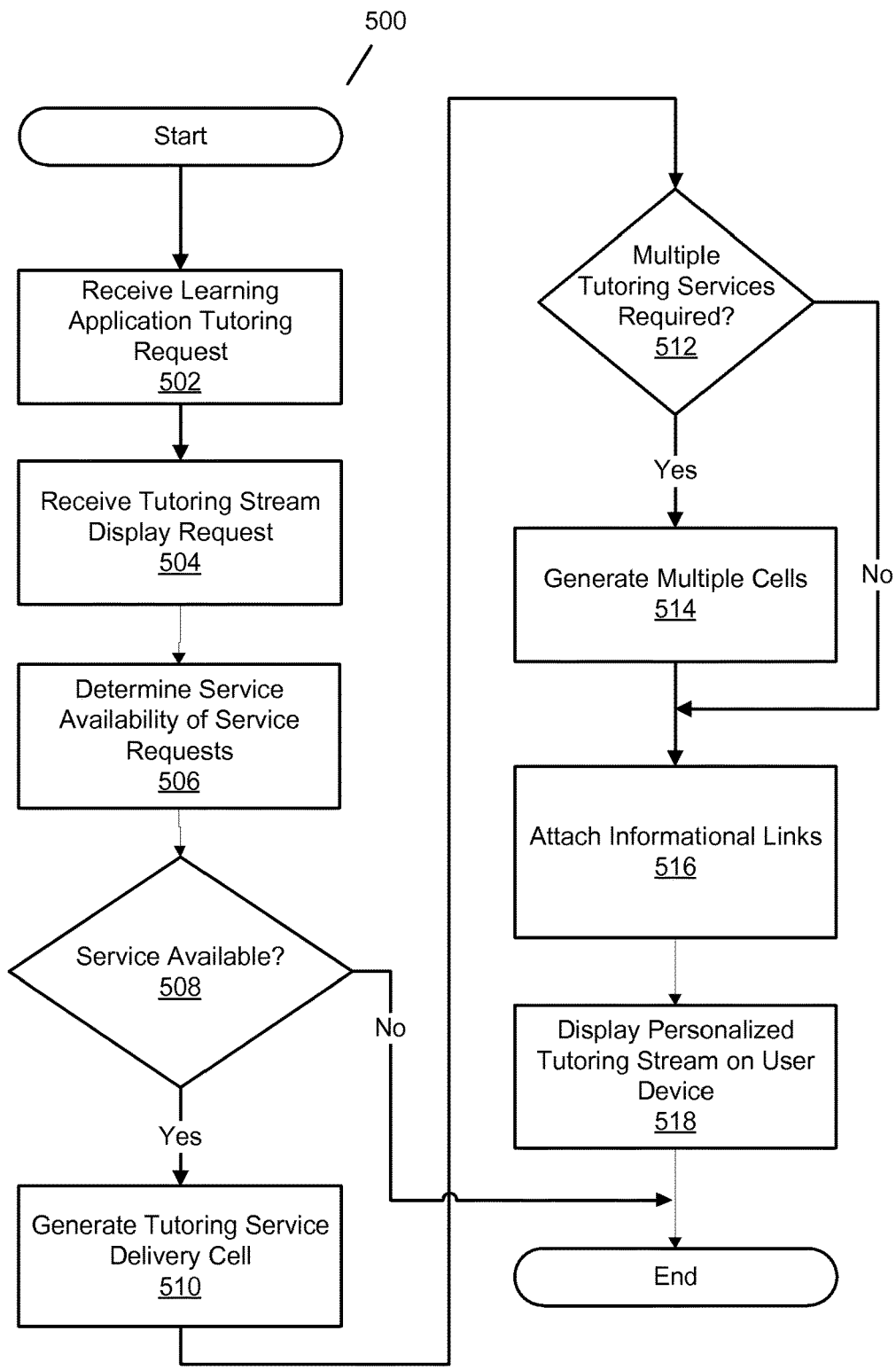
FIG. 5 is a flow diagram of the method for dynamically generating a personalized tutoring stream in a modular learning system environment.

FIG. 5 is a flow diagram 500 of the method for dynamically generating a personalized tutoring stream in a modular learning system. At step 502, the microlearning performance management module 240 receives a learning application tutoring request from a tutoring user, say user 112, for the learning application, say learning application 300, through the scheduling interface generated by tutoring stream interface generator 416 and displayed on the tutoring user 112's device 140. In some embodiments, a plurality of such requests is received from the tutoring user at the time of scheduling the tutoring service of the learning application or plurality of applications. At step 504, the personalized tutoring stream module 242 receives a tutoring stream display request from tutoring user 112 through an interface generated by the generator 416 on a user device 140. At step 506, the personalized tutoring stream generation module 242 requests the service availability module 412 to determine the availability of tutoring services of each such tutoring user, in this case tutoring user 112, for each future tutoring service item.

At step 508, the service availability module 412 determines the availability of tutoring services for the plurality of tutoring service requests by accessing a plurality of tutoring services items of the tutoring user 112 in the tutoring user database 404 for tutoring services availability. In some embodiments, the service availability module 412 may determine the availability of all tutoring services for a predetermined number of pending tutoring service requests (e.g., the availability of a mathematics tutoring user 112 to tutor, monitor or review ten different algebra exercise applications each to or for three different learning users in the next two weeks) or a predetermined date until when tutoring service availability for the learning applications needs to be determined. Such preferences may be determined by each unique tutoring user or even the modular learning system 144. If no tutoring services are available (e.g., the tutoring user has not confirmed any tutoring services in a given month while on a vacation) for the tutoring service request, the tutoring stream interface generator 416 may generate and display an interface item to request the tutoring user 112 to change or resequence the pending tutoring service request i.e. rescheduling request which specifies a learning application in the tutoring stream and a new time before generator 414 proceeds to generate the tutoring service delivery cell.

At step 510, if some tutoring services are available for the pending tutoring service request, the tutoring services cell generator 414 may access the scheduled tutoring service items from the scheduled tutoring services database 408 and generate a tutoring service delivery cell for the tutoring service to be tutored next by the tutoring user 112. At step 512, the generator 414 determines if multiple scheduled tutoring service items or a predetermined plurality of tutoring service items are required to be displayed in the tutoring stream to the tutoring user. If a single tutoring service is to be tutored next, the cell generator 414 may directly proceed to step 516 by attaching informational links to the tutoring service delivery cell (e.g., link to the learning tools to be accessed, link to the learning facility to be accessed, links to the profiles of learning users to be present at the time of the tutoring service). In other embodiments, if multiple future tutoring services are to be displayed in the personalized tutoring stream, the cell generator 414 may proceed to step 514 and generate a plurality of tutoring cells for each unique scheduled tutoring service delivery by accessing the same from the scheduled tutoring services database 408. At step 516, in such embodiments, the cell generator 414 may attach informational links to a plurality of tutoring service delivery cells and store the same for access and retrieval by the tutoring stream interface generator 416. At step 518, the tutoring stream interface generator 416 generates the tutoring stream interface items along with multiple tutoring service delivery cells and displays the same to the tutoring user 112 through the personalized stream interface on the user's user device 140 and also displays the tutoring stream on the user device comprises displaying a series of tutoring cells.

Although the method for dynamically generating a personalized tutoring stream in a modular learning system environment is described as being composed of various steps, fewer or more steps (e.g., Receive Tutoring Service Sequence Preference Inputs From Tutoring User, Send New Tutoring Service Schedule Confirmation To Learning User) may comprise the method with the present invention still falling within the scope of various embodiments.

Computing Machine Architecture

Figure 6:
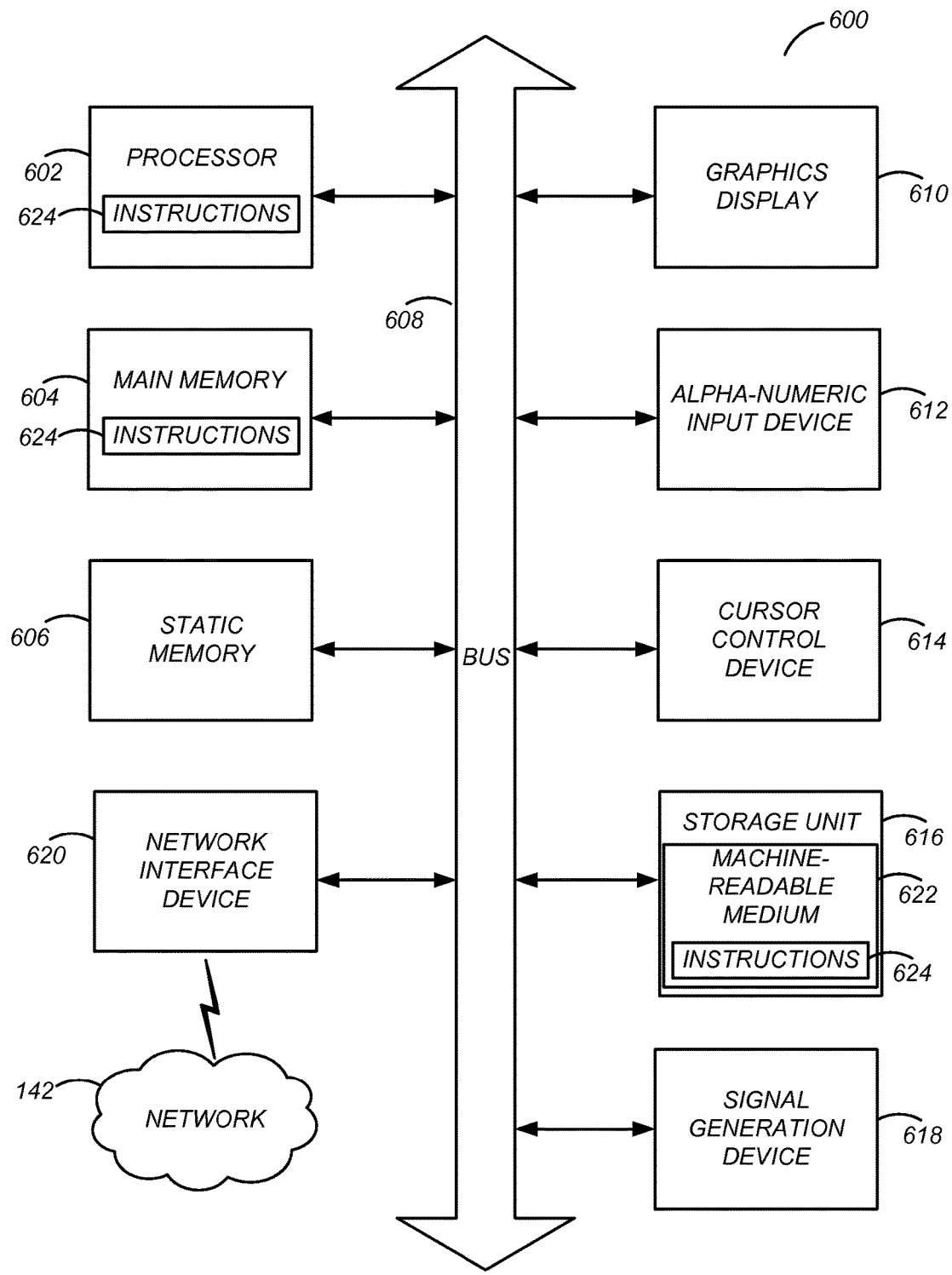
FIG. 6 illustrates components of an example machine able to read instructions from a machine-readable medium and execute them in a processor (or controller) according to one embodiment.

FIG. 6 is a block diagram illustrating components of an example machine suitable for use as a modular learning system 144 (e.g., as discussed in accordance with FIGS. 1-5), in which any of the embodiments disclosed herein may be performed, according to one embodiment. This example machine is able to read instructions from a machine-readable medium and execute them in a processor (or controller).

Specifically, FIG. 6 shows a diagrammatic representation of a machine in the example form of a computer system 600 within which instructions 624 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include a graphics display unit 610 (e.g., a plasma display panel (PDP), a liquid crystal display (LCD), a projector, or a cathode ray tube (CRT)). The computer system 600 may also include alphanumeric input device 612 (e.g., a keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 142 via the network interface device 620.

While machine readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

The modular learning system 144 may be one or more servers in which one or more methods disclosed herein are performed. The processor 602 may be a microprocessor, a state machine, an application specific integrated circuit, a field programmable gate array, etc. (e.g., Intel® Pentium® processor). The main memory 604 may be a dynamic random access memory and/or a primary memory of the modular learning system 144. The static memory 606 may be a hard drive, a flash drive, and/or other memory information associated with the modular learning system 144.

The bus 608 may be an interconnection between various circuits and/or structures of the modular learning system 144. The video display 610 may provide graphical representation of information on the modular learning system 144. The alphanumeric input device 612 may be a keypad, keyboard and/or any other input device. The cursor control device 614 may be a pointing device such as a mouse.

The storage unit 616 may be a hard drive, a storage system, and/or other longer term storage subsystem. The signal generation device 618 may be a bios and/or a functional operating system of the modular learning system 144. The network interface device 620 may be a device that may perform interface functions such as code conversion, protocol conversion and/or buffering required for communication to and from a network (e.g., the network 142 of FIG. 1). The machine readable medium 622 may provide instructions 624 on which any of the methods disclosed herein may be performed. The instructions 624 may provide source code and/or data code to the processor 602 to enable any one/or more operations disclosed herein. For example, the modular learning system 144 may be stored in the form of instructions 624 on a storage medium such as the main memory 604 and/or the machine readable medium 622 such as compact disk.

In one embodiment, a non-transitory computer-readable storage medium having a program executable by a computing device (e.g., the modular learning system 144) causes the computing device to perform method steps illustrated in FIG. 5.

Additional Configuration Considerations

The tutoring stream module 242 enables a tutoring user to repeatedly tutor new learning applications that are interesting to learning users and appropriately suited to the skills and knowledge of the tutor. In one embodiment, the tutoring stream module 242 automatically suggests regular, scheduled tutoring events to help the tutors achieve their tutoring goals. For example, the tutoring user may specify a time (e.g., every Saturday morning) to tutor learning applications. The tutoring stream module 242 may then retrieve information about the tutor's skills and interests from the tutoring database 208 and, based on the retrieved information, determine learning applications to be tutored by the tutor at the specified time. These tutoring events may be automatically scheduled and added to the tutor's personalized tutoring stream.

In one embodiment, learning users may input information about their interests (e.g., learning applications they would be interested in performing). The tutoring stream module 242 may use the learning users' interests to recommend one or more applications to the tutor, or to automatically schedule the tutoring user for tutoring the applications in an available time and add the applications to the tutor's personalized tutoring stream. Accordingly, one example advantage of the disclosed configuration is that a tutor remains continually engaged by providing them sufficient guidance through the system to help ensure that their skills remain current, relevant and sharp.

Throughout this specification, plural instances may implement modules, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate modules in example configurations may be implemented as a combined structure or module. Similarly, structures and functionality presented as a single module may be implemented as separate modules. These and other variations, modifications, additions, and improvements fall within the scope of the subject matter herein.

Certain embodiments are described herein as including functionality implemented in computing logic or a number of components, modules, or mechanisms, for example, as illustrated in FIGS. 2 and 4. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

In another embodiment, the microlearning purchase and performance interface provided by the modular learning system 144 can be accessed over a local area network, intranet or virtual private network accessible to a limited plurality of user devices at a preschool, school, college, university, educational board, professional standards authority, coaching class, a company, HR department, training department or at a training organization through a user device.

In another embodiment, the microlearning purchase and performance interface provided by the modular learning system 144 can be accessed over a wide area network, General Packet Radio Service network, an Enhanced Data for Global Evolution network, a 3G telecommunications network, a 4G LTE telecommunications network or other telecommunications network through a user device.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Although the present embodiments have been described with reference to specific example embodiments, it will be evident that various modifications and changes may be made to these embodiments without departing from the broader spirit and scope of the various embodiments. For example, the various devices, modules, databases, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine modules that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and modules of the embodiments herein. This is done merely for convenience and to give a general sense of the invention. This description should be read to include one or at least one and the singular also includes the plural unless it is obvious that it is meant otherwise.

According to the embodiments described in FIG. 1 through 7, various methods and electric structures may be embodied using transistors, logic gates, and electrical circuits (e.g., Application Specific Integrated Circuitry and/or in Digital Signal Processor circuitry). For example, the purchase management module 238, performance management module 240 and other modules of FIGS. 1 to 7 may be enabled using a purchase management circuit, a performance management circuit, and other circuits using one or more of the technologies described herein. In addition, it will be appreciated that the various operations, processes, and methods disclosed herein may be embodied in a machine-readable medium and/or a machine accessible medium compatible with a data processing system (e.g., a server) and may be performed in any order. Accordingly, the specification and drawings are to be regarded in an illustrative rather than a restrictive sense.

Upon reading this disclosure, those of skill in the art will appreciate still additional alternative structural and functional designs for a system and a process for managing the purchase and performance of learning applications and associated application services in a microlearning stack through the disclosed principles herein. Thus, while particular embodiments and applications have been illustrated and described, it is to be understood that the disclosed embodiments are not limited to the precise construction and modules disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for priority rule based dynamic updating of an asynchronous tutoring session reservation stream in a learning system, the learning system including one or more processors and a plurality of user computing devices, the plurality of user computing devices being remotely linked over a computer network through a network interface device configured to perform functions enabling communication to and from the computer network via a mobile application or a browser-based web application, a computer desktop application, an electronic module or subsystem of a social networking environment, an electronic learning content management system, a professional networking environment, an electronic commerce system, an electronic payments system, or an Internet-based website, each of the plurality of user computing devices including an electronic user interface and an electronic display, the one or more processors configured with one or more computer-implemented modules or generators including a microlearning purchase management module, a performance management module, an electronic reservation and ordered priority module, a session elements module, a tutoring stream reservation interface container generator, at least one of the one or more modules or generators including at least one learning database with learning data arranged in data fields, the method comprising:

receiving via an electronic stream generation interface, a dynamic tutor reservation stream generation request from an electronic user device associated with a tutoring user, determining by an electronic reservation and ordered priority module, any asynchronous session element modification requests to confirmed tutoring session reservations received via an electronic reservation interface on an electronic user device associated with at least one learning user;

determining by a performance management module, the compatibility of each session element of each unconfirmed tangible tutoring session reservation request with corresponding schedule-independent reservation preferences of the tutoring user;

rejecting by a performance management module, each unconfirmed tangible tutoring session reservation request incompatible with at least one corresponding predetermined reservation preference of the tutoring user;

determining by an electronic reservation and ordered priority module, any asynchronous session element modification requests to confirmed tutoring session reservations received via an electronic reservation interface on an electronic user device associated with at least one learning user;

determining by a microlearning performance management module, any asynchronous session review modification requests to completed tutoring session reservations received via an electronic reservation interface on an electronic user device associated with the tutoring user, each asynchronous session element review request comprising at least one of a plurality of editable session completion review elements including a session grade element, a session score element, a tutor review element, a session rating element, or a tutor comment element;

determining, via the dynamic tutoring session stream generator, the stream generation preferences of the tutoring user, including at least one priority rule for one or a plurality of unconfirmed tutoring session reservation requests, or at least one chronology rule for one or a plurality of confirmed tutoring session reservation requests, or at least one chronology rule for one or a plurality of reservations associated with completed tutoring sessions; and generating via an asynchronous tutoring session stream interface generator, on the electronic user device associated with the tutoring user, a dynamically updated tutoring session stream.

2. The computer-implemented method of claim 1, further comprising:

receiving a rescheduling request specifying a learning content module in the tutoring stream and a new time;

determining the availability of the at least one application service associated with the learning content module specified by the rescheduling request based on the new time and the available time associated with the at least one application service; and associating the learning content module in the tutoring stream with the new time.

3. The computer-implemented method of claim 2, wherein the learning content module is associated with sequence metadata describing the learning plurality of content modules to be tutored after the completion of the learning content module; and wherein the method further comprises of:

determining an updated time for the plurality of learning content modules to be tutored after the completion of the learning content module, wherein the updated time is after the new time of the learning content module; and associating the plurality of learning content modules to be tutored after the completion of the learning content module in the tutoring stream with the updated time.

4. A non-transitory computer-readable storage medium storing computer program instructions executable by a processor for performing a method for dynamically generating a personalized tutoring stream in a modular learning system, the method comprising:

receiving, via an electronic stream generation interface, a dynamic tutor reservation stream generation request from an electronic user device associated with a tutoring user;

determining by an electronic reservation and ordered priority module, any asynchronous session element modification requests to confirmed tutoring session reservations received via an electronic reservation interface on an electronic user device associated with at least one learning user:

determining by a performance management module, the compatibility of each session element of each unconfirmed tangible tutoring session reservation request with corresponding schedule-independent reservation preferences of the tutoring user;

rejecting by a performance management module, each unconfirmed tangible tutoring session reservation request incompatible with at least one corresponding predetermined reservation preference of the tutoring user;

determining by an electronic reservation and ordered priority module, any asynchronous session element modification requests to confirmed tutoring session reservations received via an electronic reservation interface on an electronic user device associated with at least one learning user;

determining by a microlearning performance management module, any asynchronous session review modification requests to completed tutoring session reservations received via an electronic reservation interface on an electronic user device associated with the tutoring user, each asynchronous session element review request comprising at least one of a plurality of editable session completion review elements including a session grade element, a session score element, a tutor review element, a session rating element, or a tutor comment element;

determining, via the dynamic tutoring session stream generator, the stream generation preferences of the tutoring user, including at least one priority rule for one or a plurality of unconfirmed tutoring session reservation requests, or at least one chronology rule for one or a plurality of confirmed tutoring session reservation requests, or at least one chronology rule for one or a plurality of reservations associated with completed tutoring sessions; and generating via an asynchronous tutoring session stream interface generator, on the electronic user device associated with the tutoring user, a dynamically updated tutoring session stream.

5. The non-transitory computer-readable storage medium of claim 4, wherein adding the plurality of learning content modules to the tutoring stream comprises generating a tutoring session interface element associated with each learning content module, the tutoring session interface element including information associated with the at least one application service associated with the learning content module; and wherein displaying the tutoring stream on the user device comprises displaying a series of tutoring session interface elements.

6. The non-transitory computer-readable storage medium of claim 4, wherein the method further comprises:

receiving a rescheduling request specifying a learning content module in the tutoring stream and a new time;

determining the availability of the at least one application service associated with the learning content module specified by the rescheduling request based on the new time and the available time associated with the at least one application service; and associating the learning content module in the tutoring stream with the new time.

7. The non-transitory computer-readable storage medium of claim 6, wherein the learning content module is associated with sequence metadata describing one or more learning content modules to be tutored after the completion of the learning content module; and wherein the method further comprises:

determining an updated time for the plurality of learning content modules to be tutored after completion of the learning content module, wherein the updated time is after the new time of the learning content module; and associating the plurality of learning content modules to be tutored after the completion of the learning content module in the tutoring stream with the updated time.

8. An apparatus comprising:

a processor configured to execute instructions stored on a non-transitory computer-readable storage medium;

a non-volatile memory including:

the instructions for execution on the processor, the instructions which are executable to perform steps comprising:

receiving, via an electronic stream generation interface, a dynamic tutor reservation stream generation request from an electronic user device associated with a tutoring user;

determining by an electronic reservation and ordered priority module, any asynchronous session element modification requests to confirmed tutoring session reservations received via an electronic reservation interface on an electronic user device associated with at least one learning user;

determining by a performance management module, the compatibility of each session element of each unconfirmed tangible tutoring session reservation request with corresponding schedule-independent reservation preferences of the tutoring user;

rejecting by a performance management module, each unconfirmed tangible tutoring session reservation request incompatible with at least one corresponding predetermined reservation preference of the tutoring user;

determining by an electronic reservation and ordered priority module, any asynchronous session element modification requests to confirmed tutoring session reservations received via an electronic reservation interface on an electronic user device associated with at least one learning user;

determining by a microlearning performance management module, any asynchronous session review modification requests to completed tutoring session reservations received via an electronic reservation interface on an electronic user device associated with the tutoring user, each asynchronous session element review request comprising at least one of a plurality of editable session completion review elements including a session grade element, a session score element, a tutor review element, a session rating element, or a tutor comment element;

determining, via the dynamic tutoring session stream generator, the stream generation preferences of the tutoring user, including at least one priority rule for one or a plurality of unconfirmed tutoring session reservation requests, or at least one chronology rule for one or a plurality of confirmed tutoring session reservation requests, or at least one chronology rule for one or a plurality of reservations associated with completed tutoring sessions; and generating via an asynchronous tutoring session stream interface generator, on the electronic user device associated with the tutoring user, a dynamically updated tutoring session stream.

9. The apparatus of claim 8, wherein adding the plurality of learning content modules to the tutoring stream comprises generating a tutoring session interface element associated with the learning content module, the tutoring session interface element including information associated with the at least one application service associated with the learning content module; and wherein displaying the tutoring stream on the user device comprises displaying a series of tutoring session interface elements.

10. The apparatus of claim 8, wherein the steps further comprise:

receiving a reservation request specifying a learning content module in the tutoring stream and a new time;

determining the new availability of the at least one application service associated with the learning content module specified by the reservation request based on the new time and the available time associated with the at least one application service; and associating the learning content module in the tutoring stream with the new time.

11. The apparatus of claim 10,
wherein the learning content module is associated with sequence metadata describing the plurality of learning content modules to be tutored after the completion of the learning content module; and
wherein the method further comprises:
determining an updated time for the plurality of learning content modules to be tutored after the completion of the learning content module, wherein the updated time is after the new time of the learning content module; and
associating the plurality of learning content modules to be tutored after the completion of the learning content module in the tutoring stream with the updated time.

* * * * *